US012269598B2

(12) United States Patent
Kodati et al.

(10) Patent No.: US 12,269,598 B2
(45) Date of Patent: Apr. 8, 2025

(54) ECONOMY CLASS PASSENGER SEAT ROW CONVERTIBLE TO BUNK BEDS

(71) Applicant: B/E Aerospace, Inc., Winston-Salem, NC (US)

(72) Inventors: Sambasiva Rao Kodati, Vinjaram (IN); Ravi Basavaraj Chavadi, Puppalaguda (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/215,362

(22) Filed: Jun. 28, 2023

(65) Prior Publication Data
US 2024/0043123 A1    Feb. 8, 2024

(30) Foreign Application Priority Data
Aug. 8, 2022 (IN) .............................. 202241045297

(51) Int. Cl.
*B64D 11/06*     (2006.01)
*B64D 11/00*     (2006.01)

(52) U.S. Cl.
CPC ...... *B64D 11/0641* (2014.12); *B64D 11/0644* (2014.12); *B64D 2011/0069* (2013.01)

(58) Field of Classification Search
CPC ............ B64D 11/0641; B64D 11/0644; B64D 2011/0069; A47C 17/16; A47C 17/18; A47C 17/12; B60N 2/34; B60N 2/75; B60N 2/763; B60N 2/767; B60N 2/79; B61D 33/0021; B61D 31/00
See application file for complete search history.

(56) References Cited

U.S. PATENT DOCUMENTS 11,699 A * 9/1854 Myer ..................... B60N 3/008
                                                    297/62
147,171 A * 2/1874 Reniff ................ B64D 11/0641
                                                    297/62
(Continued)

FOREIGN PATENT DOCUMENTS

FR       2692122 B1   10/1995
GB     191315906 A    3/1914
(Continued)

OTHER PUBLICATIONS

Bailey, Joanna, "Revolutionary: This Economy Seating Concept Has Bunk Beds", Published in Simply Flying Jun. 7, 2021, Retrieved from https://simpleflying.com/economy-seating-bunk-beds/.

*Primary Examiner* — Tien Q Dinh
*Assistant Examiner* — William L Gmoser
(74) *Attorney, Agent, or Firm* — Suiter Swantz IP (57) ABSTRACT

A passenger seat row, for a vehicle such as a passenger aircraft, convertible between passenger seats and bunk beds. The passenger seat row includes a frame assembly including a backrest extending substantially a length of the frame assembly, the backrest configured to move between a stowed condition against the frame assembly and a deployed condition forming a substantially horizontal bed. Armrests attached to the frame assembly reposition to support the bed when in the deployed condition. In use, deploying the backrest forms a first bed positioned over the second bed to form a bunk bed sleeping provision for use, for example, during flight.

14 Claims, 8 Drawing Sheets

(56) References Cited

U.S. PATENT DOCUMENTS

| | | | | |
|---|---|---|---|---|
| 591,095 | A * | 10/1897 | Evans | A47C 17/16 |
| | | | | 297/62 |
| 898,399 | A * | 9/1908 | Albert | A47C 17/16 |
| | | | | 5/55.1 |
| 1,292,425 | A * | 1/1919 | Bradstreet | B60N 2/34 |
| | | | | 297/62 |
| 2,081,529 | A * | 5/1937 | Canney | B64D 11/00 |
| | | | | 244/118.6 |
| 2,966,199 | A * | 12/1960 | Waerner | B60N 2/34 |
| | | | | 5/8 |
| 3,594,832 | A * | 7/1971 | Bryks | A47C 19/205 |
| | | | | 5/9.1 |
| 3,811,138 | A * | 5/1974 | Del Missier | A47C 17/17 |
| | | | | 5/118 |
| 3,898,704 | A * | 8/1975 | Gallaher | B64D 11/0691 |
| | | | | 244/118.6 |
| 4,440,439 | A * | 4/1984 | Szabo | B64D 11/06 |
| | | | | 297/62 |
| 4,555,821 | A * | 12/1985 | Page | A47C 19/205 |
| | | | | 5/9.1 |
| 4,735,456 | A * | 4/1988 | Haefelfinger | B64D 11/0641 |
| | | | | 297/62 |
| 5,259,575 | A * | 11/1993 | Cabrera | B64D 11/00 |
| | | | | 244/118.6 |
| 5,868,460 | A | 2/1999 | Christensen | |
| 6,648,407 | B1 * | 11/2003 | Michel | B64D 11/0601 |
| | | | | 297/62 |
| 6,691,952 | B2 * | 2/2004 | Keogh | B64D 11/00 |
| | | | | 5/118 |
| 7,070,149 | B2 | 7/2006 | McDonnell | |
| 7,360,261 | B1 * | 4/2008 | Sheliga | A47C 17/138 |
| | | | | 5/28 |
| 2014/0246886 | A1 * | 9/2014 | Savard | B64D 11/0641 |
| | | | | 297/62 |
| 2015/0136904 | A1 | 5/2015 | Savard et al. | |
| 2022/0242574 | A1 * | 8/2022 | Jacob | B64D 11/0641 |

FOREIGN PATENT DOCUMENTS

| | | |
|---|---|---|
| GB | 589980 A | 7/1947 |
| WO | 2002006117 A1 | 1/2002 |

* cited by examiner

ECONOMY CLASS PASSENGER SEAT ROW CONVERTIBLE TO BUNK BEDS

CROSS-REFERENCE TO RELATED APPLICATION

This nonprovisional application claims the benefit of priority of India Provisional Application No. 202241045297 filed Aug. 8, 2022 for "ECONOMY CLASS PASSENGER SEAT ROW CONVERTIBLE TO BUNK BEDS," which is hereby incorporated by reference in its entirety.

TECHNICAL FIELD AND BACKGROUND

The present disclosure relates generally to passenger seat rows such as aircraft passenger seat rows, and more particularly to an economy class passenger seat row convertible to bunk beds.

Passenger aircraft typically include different seating classes. Economy classes are characterized by rows of attached seats and a seat pitch that allows for a minimal amount of backrest recline. Premium classes are characterized by separate seats and a greater seat pitch that allows for maximum seat adjustability. In some cases, premium seats may be adjustable to form a horizontal bed.

In the case of long-haul flights, a passenger may desire to purchase an entire economy class seat row for privacy and comfort. In other cases, when a flight is not full, passengers may redistribute throughout the cabin to maximize spacing between passengers. In either case, economy class passenger seat rows do not include a provision to sleep.

Therefore, what is needed is a passenger seat row including a provision for accommodating at least two sleeping passengers.

BRIEF SUMMARY

Broadly speaking, the present disclosure is directed to passenger seat rows reconfigurable to form bunk beds.

To achieve the foregoing and other advantages, the inventive aspects disclosed herein are directed to a passenger seat row including at least two laterally adjacent passenger seats. The seat row includes a frame assembly including a backrest extending substantially a length of the frame assembly. The backrest is pivotally attached to the frame assembly such that the backrest can be repositioned to form a bed. In use, the backrest is movable between a stowed condition against the frame assembly and a deployed condition forming a substantially horizontal bed. A plurality of armrests pivotally attached to the frame are independently movable to support the backrest when the backrest is in the deployed condition forming the bed.

In some embodiments, the backrest has a first edge, a second edge, a first end, a second end, a first side, and a second side such that the first edge is pivotally attached to the frame assembly and each armrest is releasably attachable to the bed proximal to the second edge to support the second edge when the bed is in the deployed condition, each armrest when removably attached to the bed extending diagonally from a pivotal attachment point on the frame assembly to the second edge of the bed.

In some embodiments, the seat row further includes a step positioned at one end of the frame assembly for gaining access to the bed when in the deployed condition, the step attached at opposing ends to the frame assembly and including a first portion and a second portion at an angle to the first portion.

In some embodiments, the seat row further includes a passenger restraint attached to the backrest configured to restrain a passenger laying on the bed, wherein the passenger restraint extends along the first side from the first edge to the second edge.

In some embodiments, each armrest includes a catch positioned at a detached end thereof configured to interact with a latch provided on the bed proximal to the second edge, wherein the latch includes a cutout formed proximal to the second edge and a plunger positioned adjacent the cutout configured to removably engage in the catch.

In some embodiments, the plunger is coupled to one end of a cable and an opposing end of the cable is coupled to a handle positioned along the second edge, wherein in use the handle is actuated to pull the cable to move the plunger axially to release the plunger from engagement in the catch.

In some embodiments, the frame assembly includes a plurality of laterally spaced spreaders each including a lower portion positioned below a pivotal attachment point of the armrest and an upper portion positioned above the pivotal attachment point of the armrest, the upper portion supporting the backrest, and the upper and lower portions being attached or integrally formed. The frame assembly may further include spaced transverse beams coupled to the plurality of laterally spaced spreaders and a plurality of legs.

Inventive aspects disclosed herein are further directed to an aircraft passenger seat row including three laterally adjacent passenger seats. The seat row includes a frame assembly supporting a backrest extending substantially a length of the frame assembly, a backrest pivotally attached to the frame assembly and configured to rotate between a stowed condition against the frame assembly and a deployed condition forming a substantially horizontal bed, and four armrests including a first armrest positioned at one end of the frame assembly, a second armrest positioned at an opposing end of the frame assembly, a third armrest positioned to one side of the first armrest, and a fourth armrest positioned between the second and third armrests, each of the first, second, third and fourth armrests pivotally attached to the frame assembly and pivotable upward to support the backrest when in the deployed condition, each armrest extending diagonally upward when supporting the backrest in the deployed condition.

In some embodiments, the backrest has a first edge, a second edge, a first end, a second end, a first side, and a second side. The first side includes or supports a separate cushion, the first edge is pivotally attached to the frame assembly, each armrest is releasably attachable to the backrest proximal to the second edge to support the second edge when the backrest is in the deployed condition, four attachment points connecting the backrest to the frame assembly, and four attachment points connecting the backrest to the four raised armrests.

In some embodiments, the seating row includes a release mechanism for simultaneously releasing backrest latches from their respective armrest catches, the release mechanism including cabling coupled to plungers and to a handle positioned proximal to an edge of the backrest, wherein actuating the handle pulls each plunger axially thereby disengaging each plunger from engagement in its respective catch.

In some embodiments, the frame assembly includes four laterally spaced spreaders each including a lower portion positioned below a pivotal attachment point of its respective armrest and an upper portion positioned above the pivotal attachment point of its respective armrest, the upper portion supporting the backrest and the upper and lower portions being attached or integrally formed. The frame assembly further includes spaced transverse beams, for instance forward and aft beam tubes, coupled to the four laterally spaced spreaders, and at least two legs.

In some embodiments, when the backrest is in the deployed condition the seat row forms a lower bunk bed across the seat bottoms and the backrest forms an upper bunk bed positioned above the lower bunk bed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Broadly speaking, the present disclosure provides embodiments of passenger seat rows configured to convert between passenger seats and bunk beds. When implemented in an aircraft, the backrest is stowed for taxi, takeoff and landing and serves as a backrest for the seated passengers, and during flight may be deployed to form an upper bunk positioned over a lower bunk formed by the seat bottoms of the passenger seat row. When implemented as a passenger seat row, the row includes at least two, and preferably at least three, laterally adjacent passenger seats to provide adequate bed length.

Referring to FIGS. 1-4, a first embodiment of a non-limiting passenger seat row 100 includes three laterally adjacent passenger seats 102, 104, 106 supported by a frame assembly 108. Each passenger seat 102, 104, 106 generally includes a seat bottom 110, spaced frame elements implemented as spreaders 108, and two spaced armrests 114. Each seat bottom 110 is positioned between two spaced armrests. End seats may include one dedicated armrest and share one armrest, whereas middle seats may share two armrests. As discussed below, each armrest 114 is pivotally attached to the frame assembly 112, such as to the spreader 108, such that each armrest is configured to pivot, rotate or otherwise move between a use condition shown in FIG. 1 functioning as a passenger seat armrest, and a support condition shown in FIGS. 2-4 supporting the deployed position of the backrest 118. In the use condition, each armrest 114 is therefore oriented substantially horizontal and separates adjacent seats. In the deployed condition, each armrest 114 is positioned at an angle to horizontal such as diagonally inclined in the direction of the front of the seat. Each armrest 114 may be moved between its use and support conditions by respectively manually raising or lowering the detached end of the armrest.

The backrest 118 extends substantially the length (i.e., from one end to the seat row to the opposite end) of the passenger seat row 100. As shown, the backrest 118 extends continuously along the length of the passenger seat row 100 such that the backrest forms the backrest for all seats in the row. A separate headrest 116 for each passenger seat may be positioned high on the backrest 118 above the formed upper bunk bed. The backrest 118 is pivotally attached to the frame assembly 112 such that the backrest can be rotated between its stowed condition shown in FIG. 1 and its deployed condition shown in FIGS. 2-4. When stowed, the backrest 118 sits flush against the upper portion of the frame assembly 112 to serve as a backrest for the seated passenger(s). The backrest 118 spans substantially the length of the seat row 100 to provide adequate bed length for sleeping, and in some embodiments, may be constructed from a single piece of sheet metal.

When deployed, for instance during flight, the backrest 118 is oriented substantially horizontal to form a flat bed dimensioned to support a sleeping passenger laying across the length of the row. To maintain the deployed condition, each armrest 114 is moved (e.g., pivoted or rotated upwardly) to a support position followed by removably attaching the armrest to the backrest 118 as discussed further below. The backrest 118 is attached to the upper portion of the frame assembly 112 along one edge thereof and at a height such that the resulting distance between the deployed upper bunk bed and the lower bunk bed 120 is sufficient to comfortably accommodate both sleeping passengers without interference from the other bed and the overhead stowage bins. For example, the distance between the upper and lower bunk beds may range from about 80 cm to about 120 cm, more preferably from about 90 cm to about 110 cm, and most preferably from about 95 cm to about 105 cm.

When the backrest 118 is supported in the deployed condition, the lower bunk bed 120 is formed spanning across the seat bottoms 110. With each armrest 114 repositioned to its support condition, the lower bed 120 is clear of obstructions and one continuous bed can be formed, albeit with slight breaks in some cases from the separate seat bottom cushions. In some embodiments, the width of the backrest 118 is substantially equal to the combined length of the seat bottoms 110 such that the two bed lengths are approximately equal. The backrest 118 and the seat bottoms 110 may be cushioned and dress covered for comfort, durability and performance and aesthetic performance.

Figure 1:
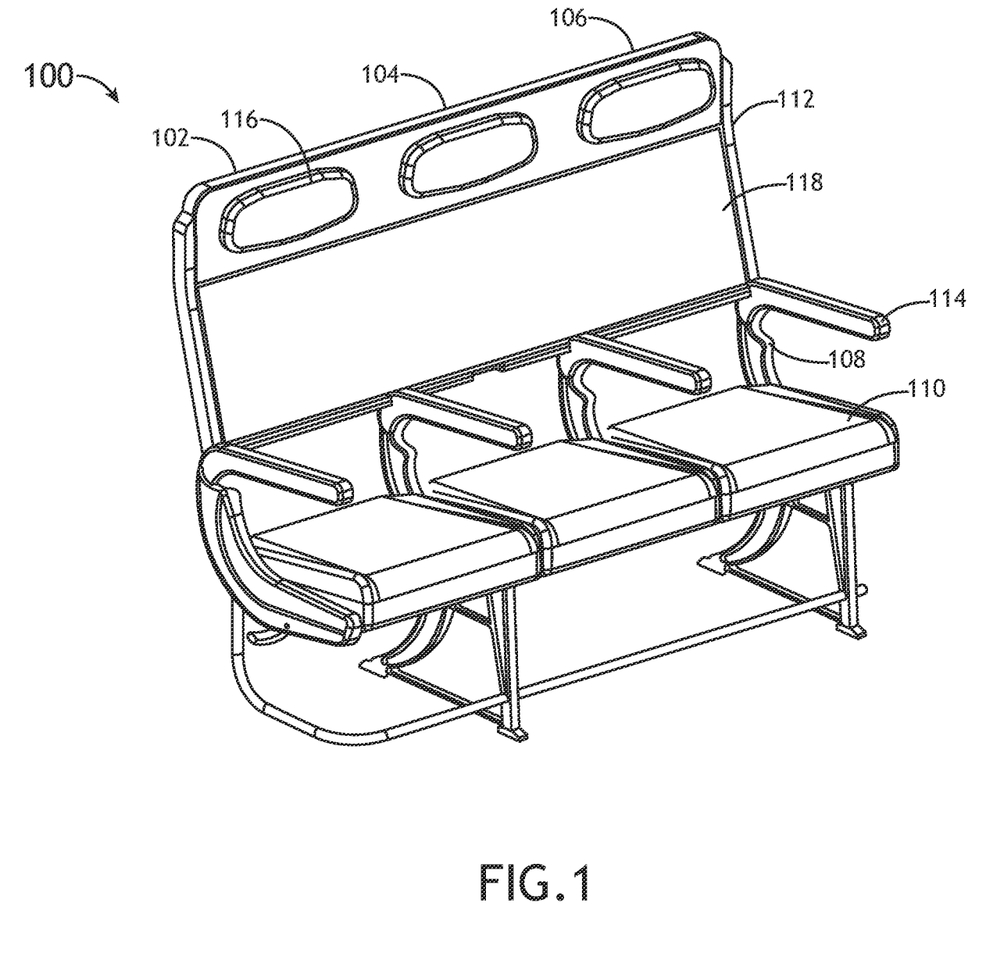
FIG. 1 is an isometric view of a passenger seat row including a deployable backrest and showing the backrest in a stowed condition.
Figure 2:
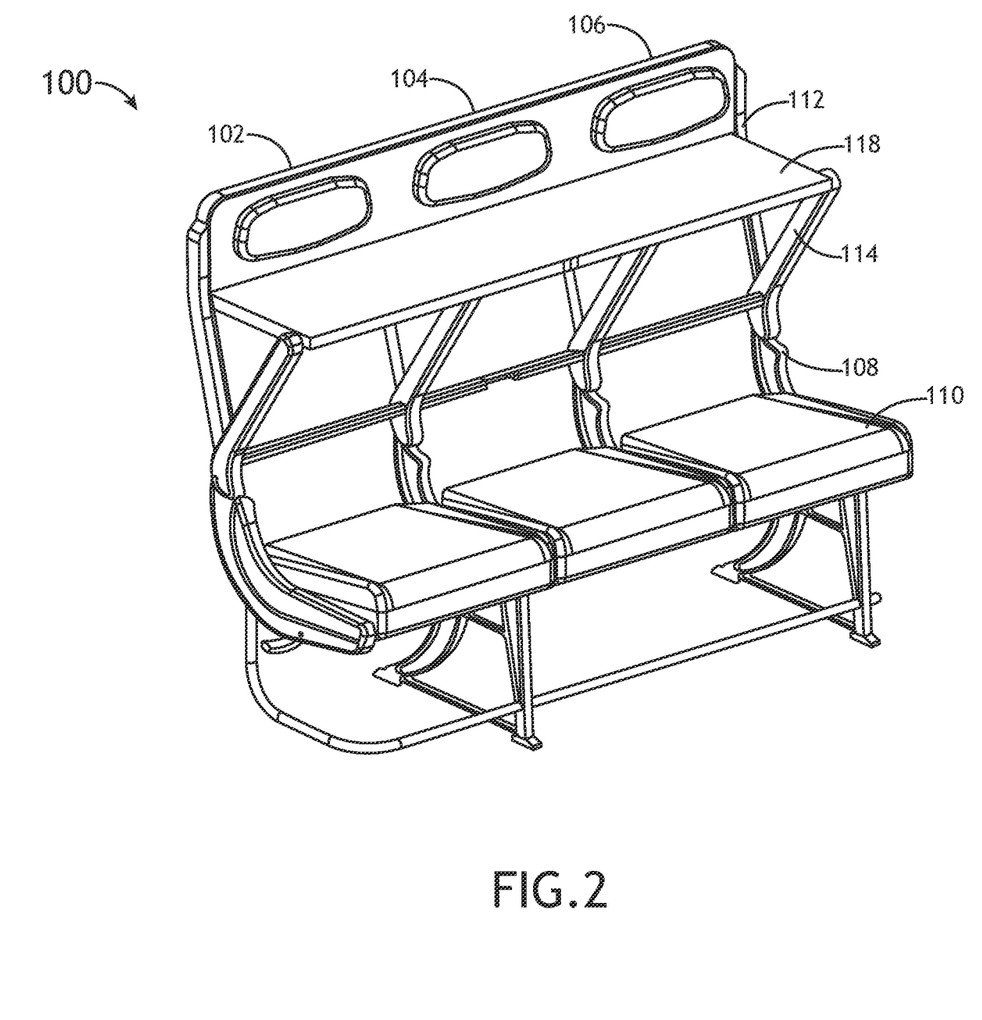
FIG. 2 is an isometric view of the passenger seat row of FIG. 1 showing the backrest in a deployed condition forming bunk beds.
Figure 3:
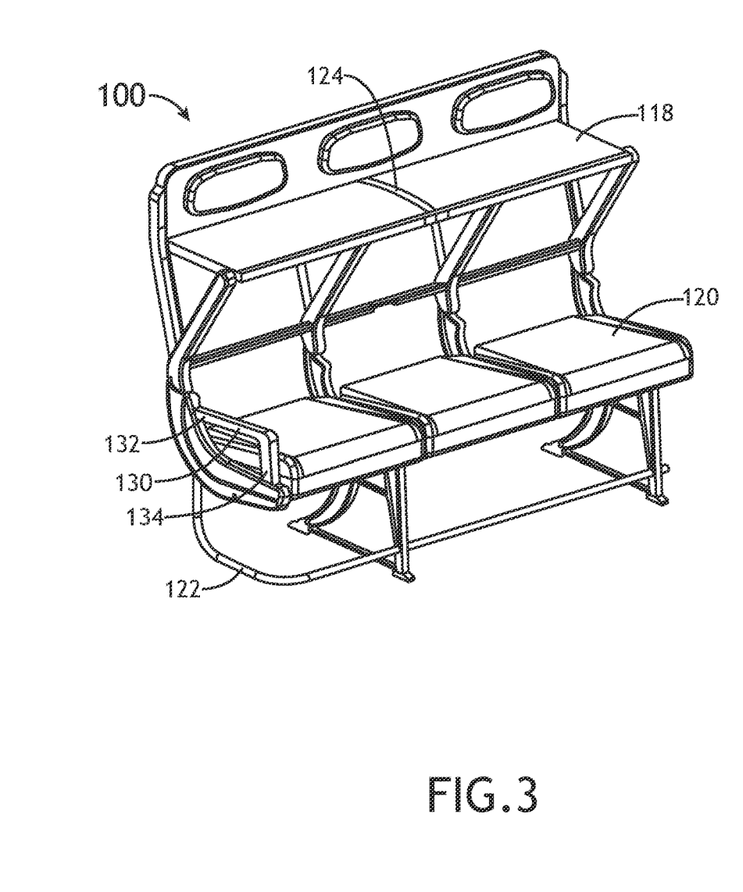
FIG. 3 is an isometric view of the passenger seat row including an optional passenger restraint associated with the backrest and an optional step associated with the frame assembly for gaining access to the deployed upper bunk.
Figure 4:
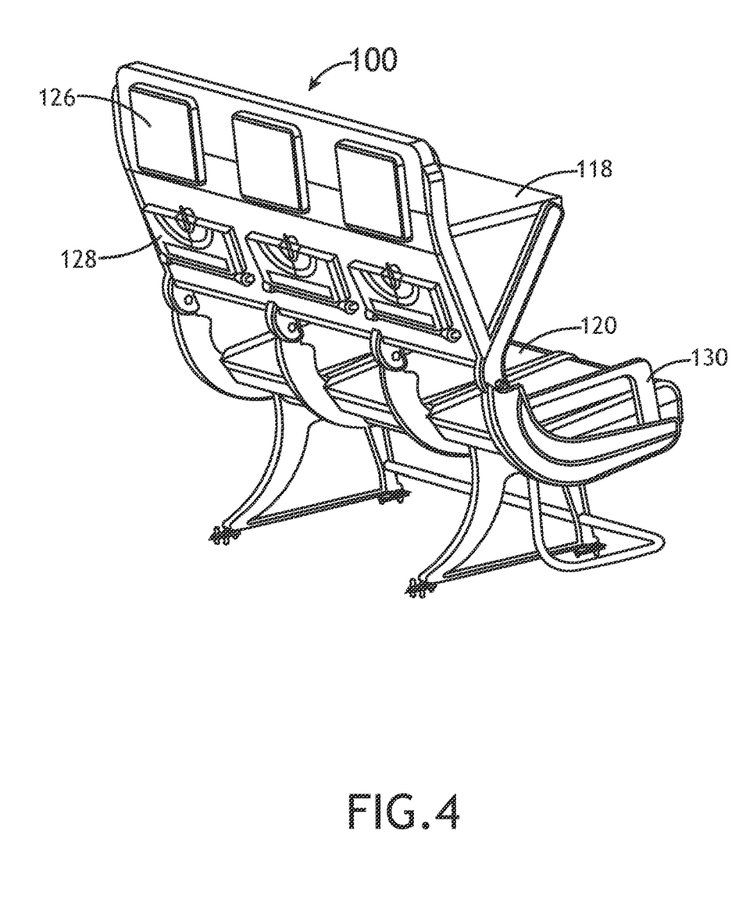
FIG. 4 is a rear isometric view of the passenger seat row showing the deployed upper bunk and passenger amenities mounted to the frame assembly.

With reference to FIG. 3, the passenger seat row 100 may further include a luggage retention bar 122 positioned under the seat bottoms elevated slightly above the floor. A passenger restraint 124 attaches to the backrest 118. In some embodiments, the passenger restraint 124 is implemented as a seat belt that extends across the width of the top of the bed 118 from one edge to the opposite edge. In use, a passenger laying on the bed may secure the passenger restraint 124 around his/her waist. With reference to FIG. 4, the backside of the backrest 112 may serve to mount passenger amenities such as video monitors 126, deployable tray tables 128, literature pockets and other amenities for use by a passenger in an aft positioned row.

The passenger seat row 100 may further include a step 130 for gaining access to the upper bunk bed 118 such that passenger and/or flight crew can avoid stepping on the seat bottoms. As shown, the step 130 may be implemented as a fixed step positioned at an aisle end of the passenger seat row 100. In some embodiments, the step 130 may include a first portion 132 and a second portion 134 at an angle to the first portion, wherein the first portion functions as a step and the second portion functions to elevate the step above the seat bottom cushion. Each of the first and second portions 132, 134, which may be attached or integrally formed, attach to the frame assembly 112. When the end of row armrest 114 at the step end of the seat row is in its use condition, the step is generally concealed beneath the armrest and becomes revealed when the armrest is raised to its support condition.

Figure 5:
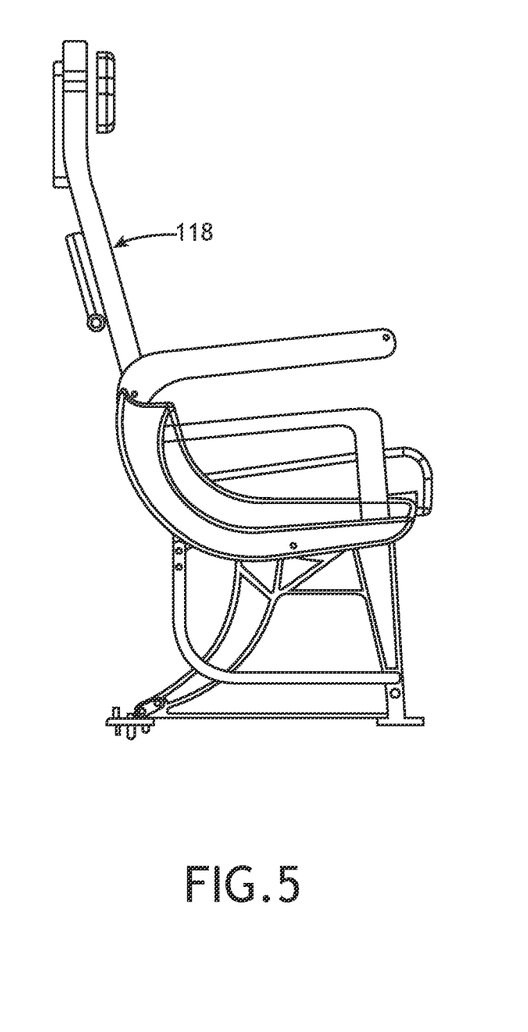
FIG. 5 is a side elevation view of the passenger seat row of FIG. 1 showing the backrest in a stowed condition forming passenger seats.
Figure 6:
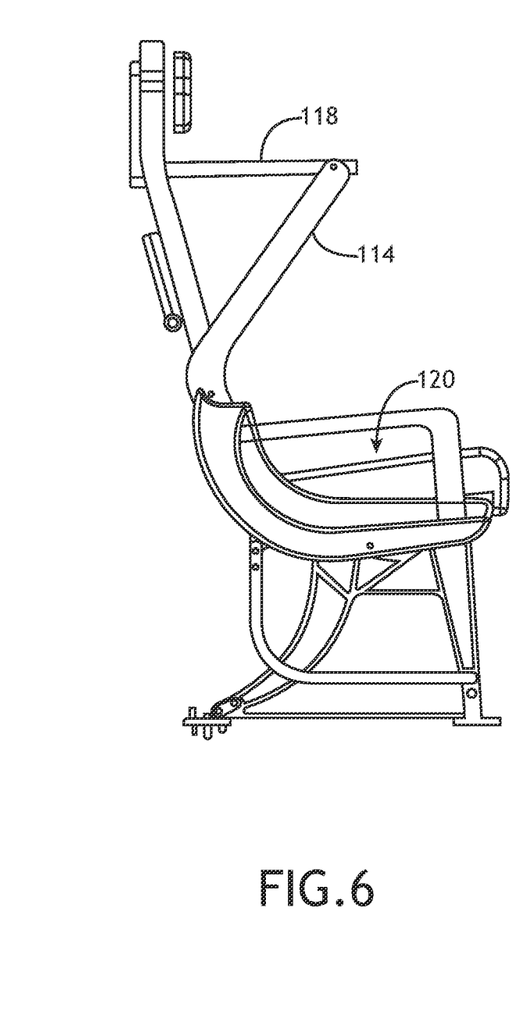
FIG. 6 is a side elevation view of the passenger seat row of FIG. 1 showing the backrest in a deployed condition forming bunk beds.

Referring to FIG. 5, when the backrest 118 is stowed, the passenger seat row 100 has the appearance of a conventional passenger seat row. In some embodiments, the backrest 118 may stow with a recess formed in the upper portion of the frame assembly 112. Referring to FIG. 6, when the backrest 118 is deployed, the upper bunk bed may be positioned slightly aft of the lower bunk bed 120 considering the fixed TTOL backrest angle and sitting ergonomics of the seats. When in the support condition, each armrest 114 braces the detached edge of the backrest 118 from below thereby preventing the deployed bed from being pivoted or rotated downward toward the stowed condition.

Figure 7A:
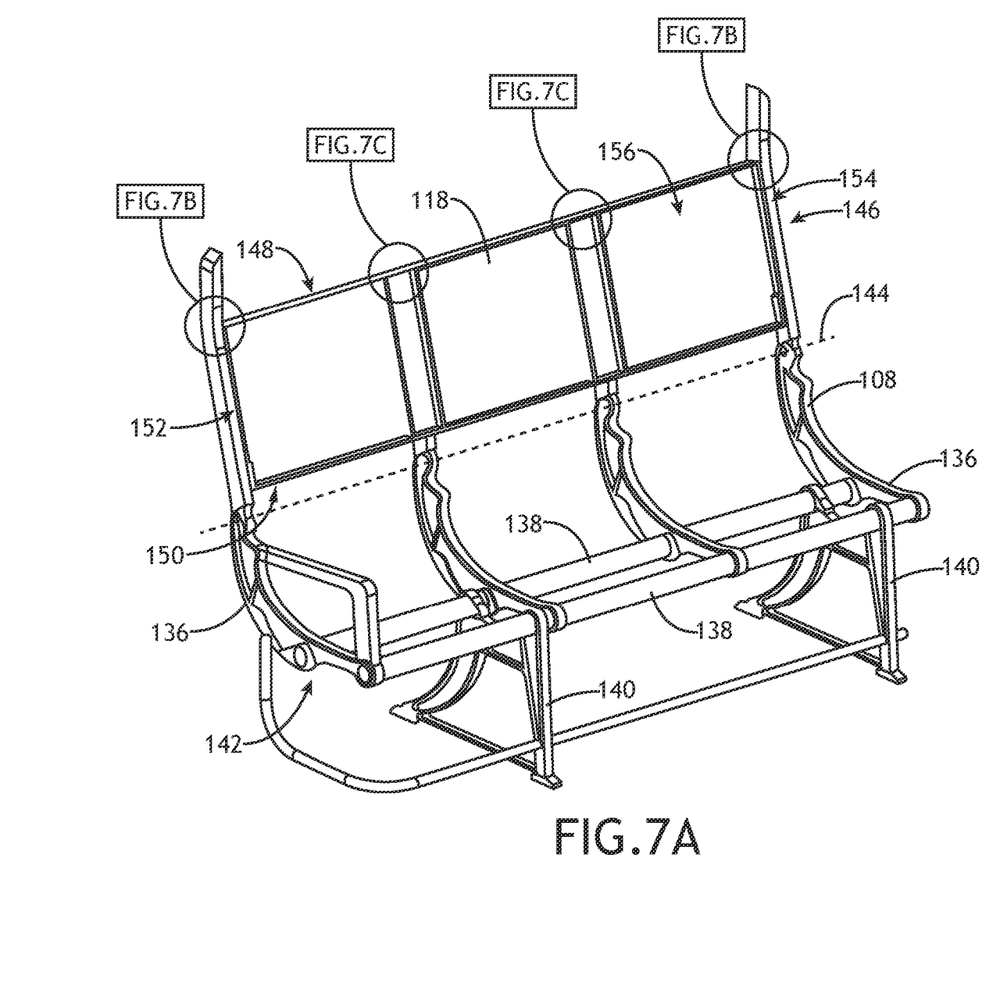
FIG. 7A is an isometric view of the frame assembly and backrest of the seat row of FIG. 1 showing the backrest in the stowed condition.

Referring to FIG. 7A, the spreaders 108 may include lower portions 136 supporting the seat bottom and pivoting armrests. Transverse beams 138, for instance forward and aft beam tubes, span the length of the seat row. Seat legs 140 serve to support the frame assembly elevated above the floor. Track fasteners may serve to attach the seat legs 140 to the floor, for instance to embedded seat tracks. Each spreader 108 includes the lower portion 136 positioned generally below the pivot point 144 of the armrests and an upper portion 146 positioned generally above the pivot point of the armrests. The row end 142 may be positioned adjacent the fuselage wall or aisle. The lower and upper portions 136, 146 may be attached together or integrally formed. In some embodiments, the upper portions 146 collectively define the curvature of the seat backs and the lower portions define the curvature of the seat bottoms, for example, to provide an ergonomic cradling upright sitting position. Each spreader 108 and other frame elements may be foraminous to save weight. The forward and aft transverse beams 138 span substantially the length of the passenger seat row and are coupled to each spreader 108. In some embodiments, the transverse beams 138 serve to attach the seat pans supporting the seat bottoms. The seat legs 140 may be attached to the transverse beams 138 and/or to the spreaders 108.

Figure 7B:
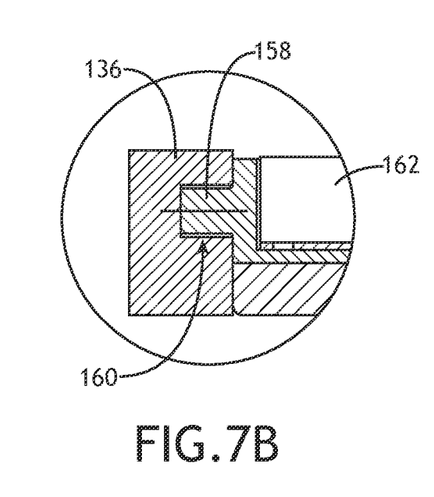
FIG. 7B is a detailed cross-sectional view of FIG. 7A showing backrest attachment to first frame elements.

In some embodiments, the backrest 118 is a continuous, elongate rectangular member generally including a first edge 148, a second edge 150, a first end 152, a second end 154, a first side 156, and a second side opposite the first side. The first edge 148 may be pivotally attached to the frame assembly such that the second edge 150 is detachable to be selectively raised or lowered to respectively deploy or stow the backrest 118. Referring to FIG. 7B, each of the first and seconds ends of the backrest 118 is pivotally attached to an inboard side of the upper portion of the frame assembly. As shown, a pin 158 protruding laterally from the first end proximal to the first edge rotatably engages in an opening 160 formed on the inboard side of the frame element. The backrest 118 further includes a cushion 162. In use, the pin 158 maintains the backrest 118 to the frame element while allowing the backrest to rotate between the stowed and deployed conditions. The same is true of the second end of the bed to provide a symmetrical attachment arrangement.

Figure 7C:
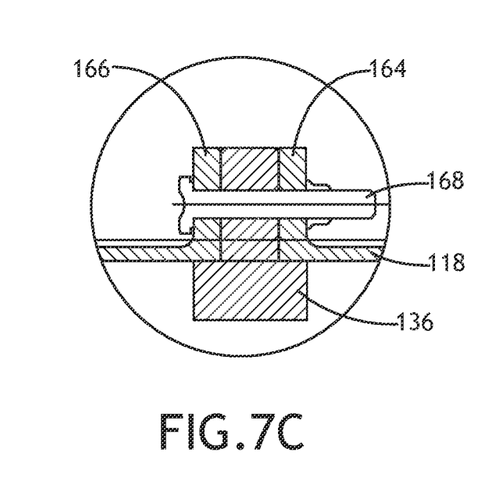
FIG. 7C is a detailed cross-sectional view of FIG. 7A showing backrest attachment to second frame elements.

Referring to FIG. 7C, each middle frame element includes an opening 164 formed at a terminal end, wherein spaced flanges 166 formed on the backrest 118 define openings which are aligned with the opening formed at terminal end of the spreader. A pin 168 received through the aligned openings of the spreader 136 and the flanges rotationally couples the backrest 118 to frame assembly. In use, the backrest 118 pivots about the pivot axis of the pins 168 and sits against the front face of the middle frame elements when stowed.

Figure 8A:
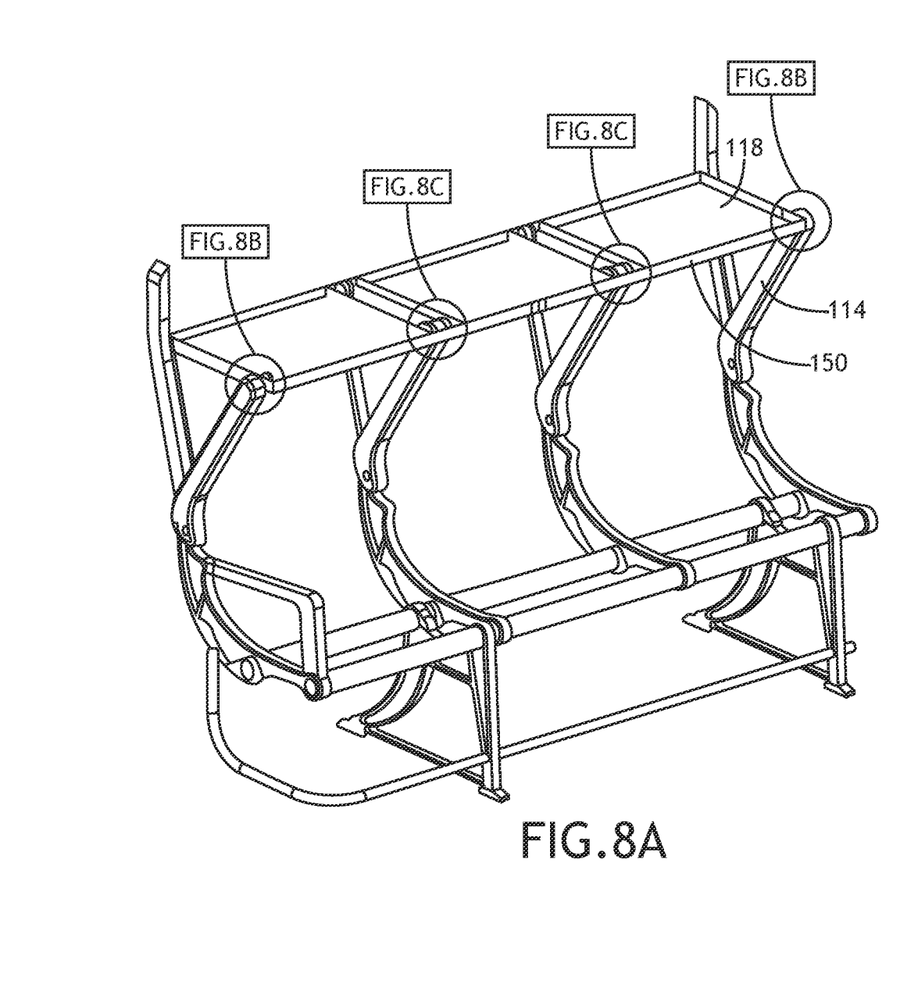
FIG. 8A is an isometric view of the frame assembly and backrest of the seat row of FIG. 1 shown backrest in the deployed condition.

Referring to FIG. 8A, the second edge 150 of the backrest 118 is configured to detach from the frame assembly to then raise to the deployed condition. Simultaneously or subsequently, each armrest 114 is individually raised to its support condition for attachment to the backrest 118 by way of a latch carried on the backrest configured to engage a catch carried on each armrest. The length of the armrests 114 and width of the backrest 118 are such that they cooperate to position the deployed bed substantially horizontal. In passenger seat row embodiments including three seats and four armrests, the backrest 118 is supported at four spaced apart armrest attachment points as shown in FIG. 8A.

Figure 8B:
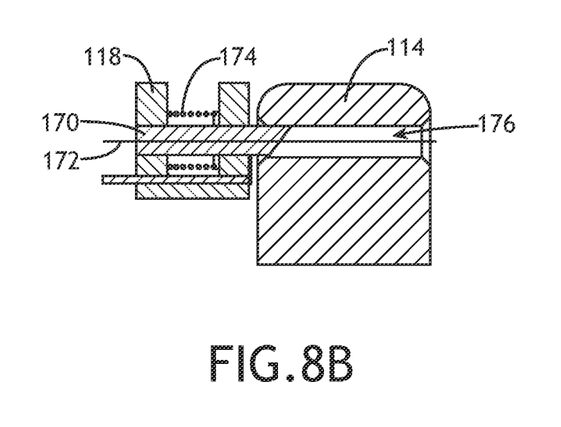
FIG. 8B is a detailed cross-sectional view of FIG. 8A showing backrest attachment to first (e.g., end) armrests.
Figure 8C:
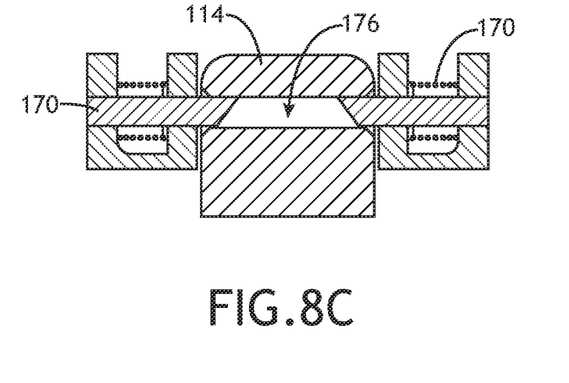
FIG. 8C is a detailed cross-sectional view of FIG. 8B showing backrest attachment to second (e.g., middle) armrests.

Referring to FIG. 8B, the first and second ends of the backrest 118 removably attach to the end armrests 114 proximal to the second edge. For example, the backrest 118 includes latches carrying spring loaded plungers 170 each biased toward the inboard side of their respective end armrest 114. A cable 172 coupled to one end of the plunger 170 is pulled to overcome the biasing force of a helical compression spring 174 surrounding the plunger 170. Pulling the cable 172 causes the plunger 170 to withdraw from a catch, for instance an opening 176, formed in the armrest 114 thereby detaching the bed from the armrest. Similar catches may be provided in the upper portion of the spreaders for engaging the bed latches to lock the bed in the stowed condition. Referring to FIG. 8C, each middle armrest 114 forms similar openings 176 for receiving plungers 170 carried on the frame inward of the first and second ends.

Figure 9A:
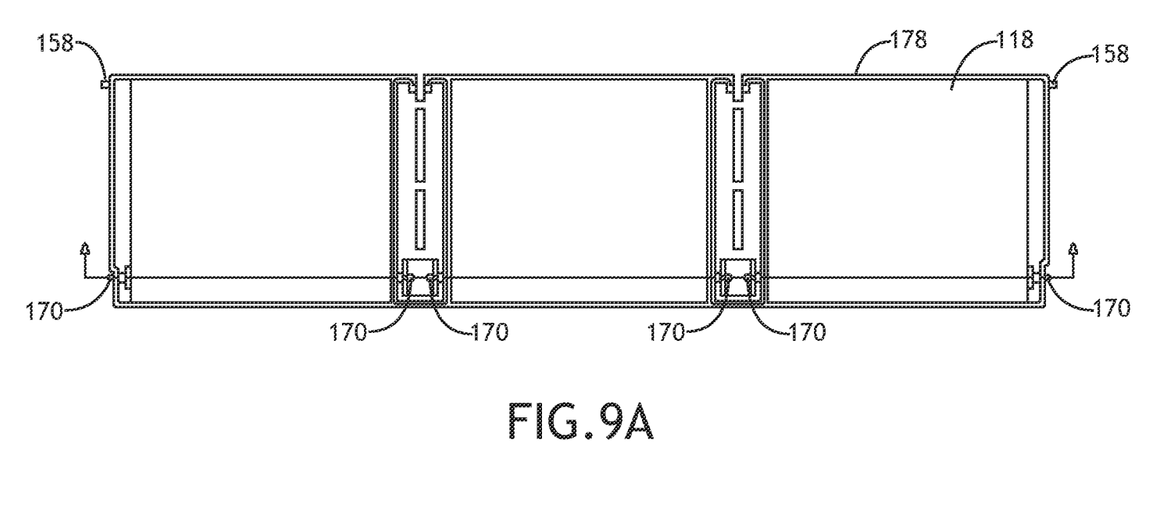
FIG. 9A is a top view of the backrest showing attachment points.
Figure 9B:
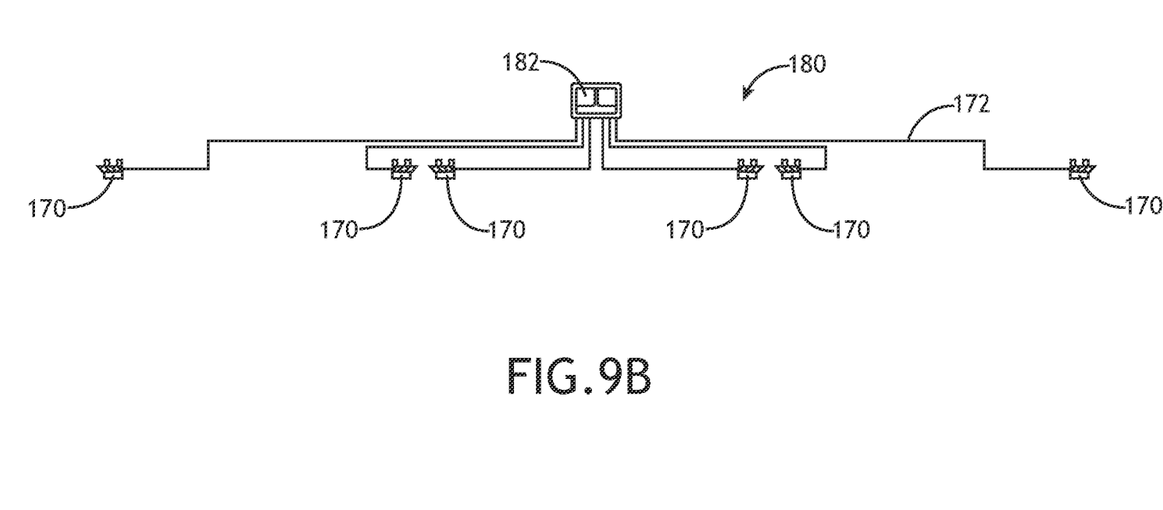
FIG. 9B is a schematic diagram showing an exemplary backrest release mechanism.

Referring to FIG. 9A, the backrest 118 includes a frame 178 carrying the pivot pins 158 positioned proximal to the first edge for facilitating rotational motion of the backrest, and further carrier the latches including the plungers 170. Referring to FIG. 9B, a cable release mechanism 180 located in the bed frame operates to actuate simultaneous release of the plungers 170. Each plunger 170 is coupled to one end of a cable 172 and each cable is in turn coupled at an opposing end to a handle 182, such as a lever. In some embodiments, the cables may be Bowden cables. In use, actuating the handle 182 translates the cables relative to their casing thereby pulling the plungers 170 to withdraw the plungers from their respective catches. Release of the handle returns the plungers 170, by the acting spring force of the helical coil springs, to their extended positions. In some embodiments, the handle 182 is positioned along the second edge to be accessible to the passenger or flight crew for deploying and stowing the bed.

Figure 10A:
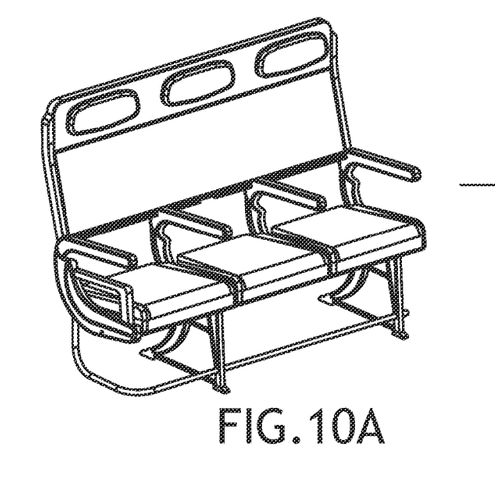
FIGS. 10A-D show the sequential steps for converting the passenger seat row from passenger seats to bunk beds.
Figure 10B:
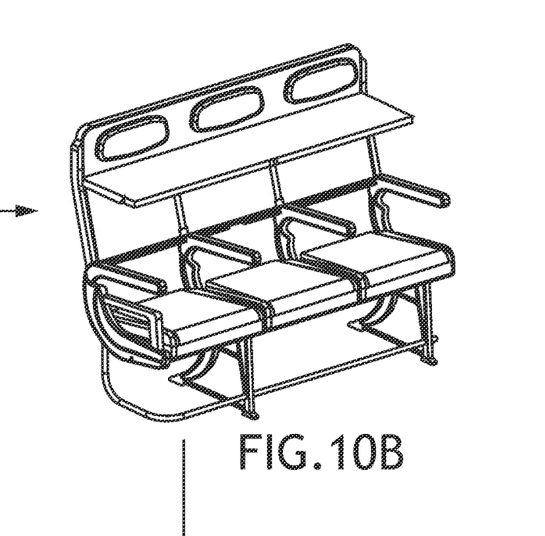
Figure 10C:
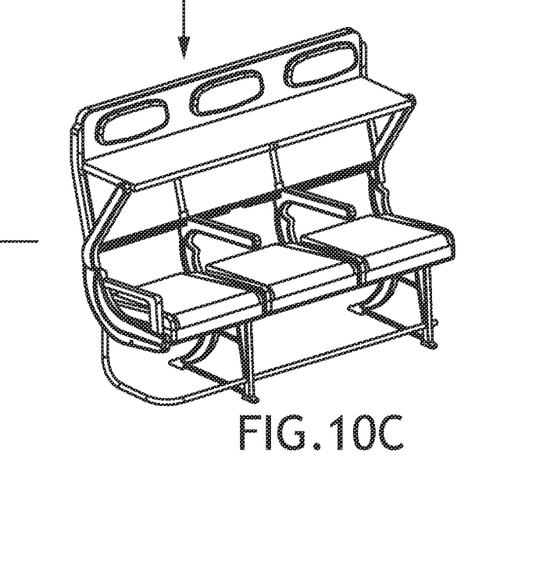
Figure 10D:
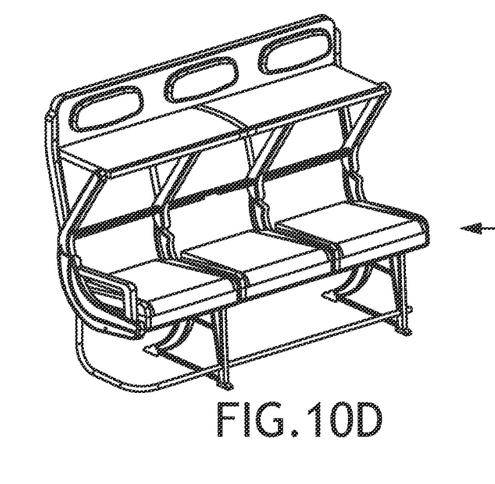

Referring to FIGS. 10A-D, the deployment sequence for deploying the bed includes unlocking the backrest from the frame assembly by actuating the handle (FIG. 10A), lifting the second edge of the backrest upward to the fully deployed position (FIG. 10B), raising at least one armrest, for instance the end armrests, and attaching the raised armrests to the backrest by engaging the latches and catches (FIG. 10C), and raising the remaining armrests, for instance the middle armrests, and attaching the remaining armrests to the backrest by engaging the latches and catches (FIG. 10D). The sequence of steps is performed in reverse to stow the backrest.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A passenger seat row convertible between passenger seats and bunk beds, comprising:
   a frame assembly defining at least two seat positions;
   a backrest pivotally attached to the frame assembly and spanning substantially a length of the frame assembly, the backrest configured to pivot between a stowed condition against the frame assembly and a deployed condition forming a substantially horizontal bed; and
   a plurality of armrests pivotally attached to the frame, each armrest configured to be positioned to support the backrest in the deployed condition,
   wherein:
   the backrest has a first edge, a second edge, a first end, a second end, a first side, and a second side;
   the first edge is pivotally attached to the frame assembly; and
   each armrest is releasably attachable to the backrest proximal to the second edge to support the second edge when the backrest is in the deployed condition, each armrest when removably attached to the backrest extending diagonally from a pivotal attachment point on the frame assembly to the second edge of the backrest.

2. The passenger seat row according to claim 1, further comprising:
   a step positioned at one end of the frame assembly for accessing an upper bunk bed formed atop the backrest when in the deployed condition, the step attached to the frame assembly and including a first portion and a second portion at an angle to the first portion; and
   a passenger restraint attached to the backrest and configured to restrain a passenger laying on the backrest, wherein the passenger restraint extends along the first side from the first edge to the second edge.

3. The passenger seat row according to claim 1, wherein each armrest includes a catch positioned at a detached end of the armrest configured to engage a latch carried on the backrest positioned proximal to the second edge.

4. The passenger seat row according to claim 3, wherein the latch is positioned adjacent to a cutout formed proximal to the second edge for receiving the end of the armrest, and the latch includes a spring-loaded plunger positioned to removably engage in the catch when the armrest is received in the cutout.

5. The passenger seat row according to claim 4, wherein the plunger is coupled to one end of a cable and an opposing end of the cable is coupled to a handle positioned along the second edge, and wherein in use the handle is actuated to pull the cable to move the plunger axially to release the plunger from engagement in the catch.

6. The passenger seat row according to claim 1, wherein the frame assembly comprises:
   a plurality of laterally spaced spreaders each including a lower portion positioned below a pivotal attachment point of the armrest and an upper portion positioned above the pivotal attachment point of the armrest, the upper portion forming a support part of the frame assembly, and the upper and lower portions being attached or integrally formed;
   spaced transverse beams coupled to the plurality of laterally spaced spreaders; and
   a plurality of legs attached to at least one of the spaced transverse beams and the plurality of laterally spaced spreaders.

7. An aircraft passenger seat row including three laterally adjacent passenger seats, comprising:
   a frame assembly;
   a backrest pivotally attached to the frame assembly and spanning substantially a length of the frame assembly, the backrest configured to pivot between a stowed condition against the frame assembly and a deployed condition forming a substantially horizontal bed; and
   four armrests including a first armrest positioned at one end of the frame assembly, a second armrest positioned at an opposing end of the frame assembly, a third armrest positioned to one side of the first armrest, and a fourth armrest positioned between the second and third armrests, each of the first, second, third and fourth armrests pivotally attached to the frame assembly and pivotable upward to support the backrest when in the deployed condition, each armrest extending diagonally upward when supporting the backrest in the deployed condition.

8. The aircraft passenger seat row according to claim 7, wherein:
   the backrest has a first edge, a second edge, a first end, a second end, a first side, and a second side;

the first side carries a cushion;

the first edge is pivotally attached to the backrest;

each armrest is releasably attachable to the backrest proximal to the second edge to support the second edge when the backrest is in the deployed condition;

at least four separate attachment points connect the backrest to the frame assembly; and at least four separate attachment points connect the backrests to the four armrests.

9. The aircraft passenger seat row according to claim 8, further comprising a passenger restraint attached to the backrest and configured to restrain a passenger laying on the backrest, wherein the passenger restraint extends along the first side from the first edge to the second edge.

10. The aircraft passenger seat row according to claim 7, further comprising a step positioned at one end of the frame assembly for accessing the backrest when in the deployed condition, the step attached to the frame assembly and including a first portion and a second portion at an angle to the first portion.

11. The aircraft passenger seat row according to claim 7, wherein:

each armrest includes a catch positioned at a detached end of the armrest configured to engage a latch on the backrest positioned proximal to the second edge; and the latch includes a cutout formed proximal to the second edge and a plunger positioned adjacent the cutout configured to removably engage in the catch.

12. The aircraft passenger seat row according to claim 11, further comprising a release mechanism for simultaneously releasing each plunger from its respective catch, the release mechanism comprising cabling coupled to each plunger and to a handle positioned along the second edge of the backrest, wherein actuating the handle pulls each plunger axially thereby disengaging each plunger from its respective catch.

13. The aircraft passenger seat row according to claim 7, wherein the frame assembly comprises:

four laterally spaced spreaders each including a lower portion positioned below a pivotal attachment point of its respective armrest and an upper portion positioned above the pivotal attachment point of its respective armrest, the upper portion forming a support part of the frame assembly, and the upper and lower portions being attached or integrally formed;

spaced transverse beams coupled to the four laterally spaced spreaders; and at least two legs.

14. The aircraft passenger seat row according to claim 13, wherein, when the backrest is in the deployed condition, an additional bed is formed along the lower portions of the four laterally spaced spreaders, wherein the additional bed is positioned below the deployed backrest.

\* \* \* \* \*